(12) United States Patent
Takahashi

(10) Patent No.: US 6,499,786 B2
(45) Date of Patent: Dec. 31, 2002

(54) CHILD SEAT ATTACHMENT STRUCTURE AND MANUFACTURING APPARATUS THEREFOR

(75) Inventor: Takahiro Takahashi, Isehara (JP)

(73) Assignee: Nissan Motor Co., Ltd., Kanagawa (JP)

(*) Notice: Subject to any disclaimer, the term of this patent is extended or adjusted under 35 U.S.C. 154(b) by 0 days.

(21) Appl. No.: 09/761,181

(22) Filed: Jan. 18, 2001

(65) Prior Publication Data

US 2002/0030378 A1 Mar. 14, 2002

(30) Foreign Application Priority Data

Feb. 4, 2000 (JP) ........................................ 2000-027592

(51) Int. Cl.[7] ................................................. B60N 2/28
(52) U.S. Cl. .................. 296/65.03; 296/63; 297/250.1; 280/801.1
(58) Field of Search ................................. 296/63, 65.03, 296/64, 65.01; 297/250.1, 253, 256.16; 280/801.1, 801.2

(56) References Cited

U.S. PATENT DOCUMENTS 6,234,572 B1 * 5/2001 Shiino et al. ................ 297/253
6,354,648 B1 * 3/2002 Allan et al. ............... 296/65.03

FOREIGN PATENT DOCUMENTS

WO 98/38061 * 9/1998

* cited by examiner

Primary Examiner—Joseph D. Pape
(74) Attorney, Agent, or Firm—Shinjyu Global IP Counselors, LLP

(57) ABSTRACT

A child seat attachment structure install a child seat in a vehicle. The child seat attachment structure includes a bracket having an attachment area that is adapted to be attached to a portion of the vehicle, and two anchors that are fixedly coupled to the bracket with a predetermined distance between the anchors. The attachment area is adapted to be attached to a seatbelt anchor mount of the vehicle so as to be fastened together. The child seat attachment structure can be easily installed in the vehicle in a more precise position in the vehicle. Further, the child seat attachment structure can be retrofitted to vehicles that have already been sold.

15 Claims, 6 Drawing Sheets

Figure 7

CHILD SEAT ATTACHMENT STRUCTURE AND MANUFACTURING APPARATUS THEREFOR

BACKGROUND OF THE INVENTION

1. Field of the Invention

This invention generally relates to a child seat attachment structure. More specifically, the present invention relates to a child seat attachment structure for attaching child seats in vehicles such as automobiles. This invention further relates to a child seat attachment structure manufacturing apparatus. More specifically, the present invention relates to a child seat attachment structure manufacturing apparatus that manufactures a child seat attachment structure of the present invention.

2. Background Information

It is desirable to install a child seat for safety when children ride in automobiles. Conventionally, in order to install a child seat, anchors are attached directly to areas of a vehicle floor panel by welding and fixing, such that a child seat can be installed to the anchors. In this case, a reinforcing material having a hatshaped cross section is attached to the opposite side of the areas of the floor panel where the anchors are welded. Nevertheless, when the anchors are directly welded and fixed to the floor panel in this manner, it is difficult to attach the anchors to precise desired positions of the floor panel. If the anchors are not attached to the precise positions of the floor panel, it is difficult to install a child seat in the vehicle stably.

Also, when the anchors are directly welded and fixed to the floor panel, the reinforcing material needs to be attached to the opposite side of the floor panel. Consequently, the reinforcing material increases the weight and cost of the vehicle.

Moreover, when the anchors are directly welded and fixed to the floor panel, whenever a design of the floor panel is changed, the positions of the anchors also have to be changed. Therefore, positions of anchors cannot be determined in an efficient manner.

In addition, in the case where the anchors are directly welded and fixed to the floor panel, it is difficult to retrofit anchors to vehicles that have already been sold to consumers.

In view of the above, there exists a need for a child seat attachment structure which overcomes the above mentioned problems in the prior art. This invention addresses this need in the prior art as well as other needs, which will become apparent to those skilled in the art from this disclosure.

SUMMARY OF THE INVENTION

One aspect of the present invention is to provide a child seat attachment structure which enables tight and stable installation of child seats with a simple handling, and can be installed in vehicles that have already been sold.

Another aspect of the present invention is to provide a manufacturing apparatus for manufacturing a child seat attachment structure of the present invention.

One aspect of the present invention can be basically attained by providing a child seat attachment structure adapted to install a child seat in a vehicle. The child seat attachment structure comprises a bracket and two anchors. The bracket has an attachment area that is configured to be attached to a portion of the vehicle. The anchors are fixedly coupled to the bracket with a predetermined lateral distance between the anchors. The anchors are configured to attach a child seat thereto.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention are provided for illustration only, and not for the purpose of limiting the invention as defined by the appended claims and their equivalents.

In the description that follows, references to directions such as "lateral", "up", "down", "front" and "rear" are made with respect to the riding orientation of the vehicle. For instance, "rearward direction" refers to the direction toward the rear of the vehicle.

FIRST EMBODIMENT

Figure 1:
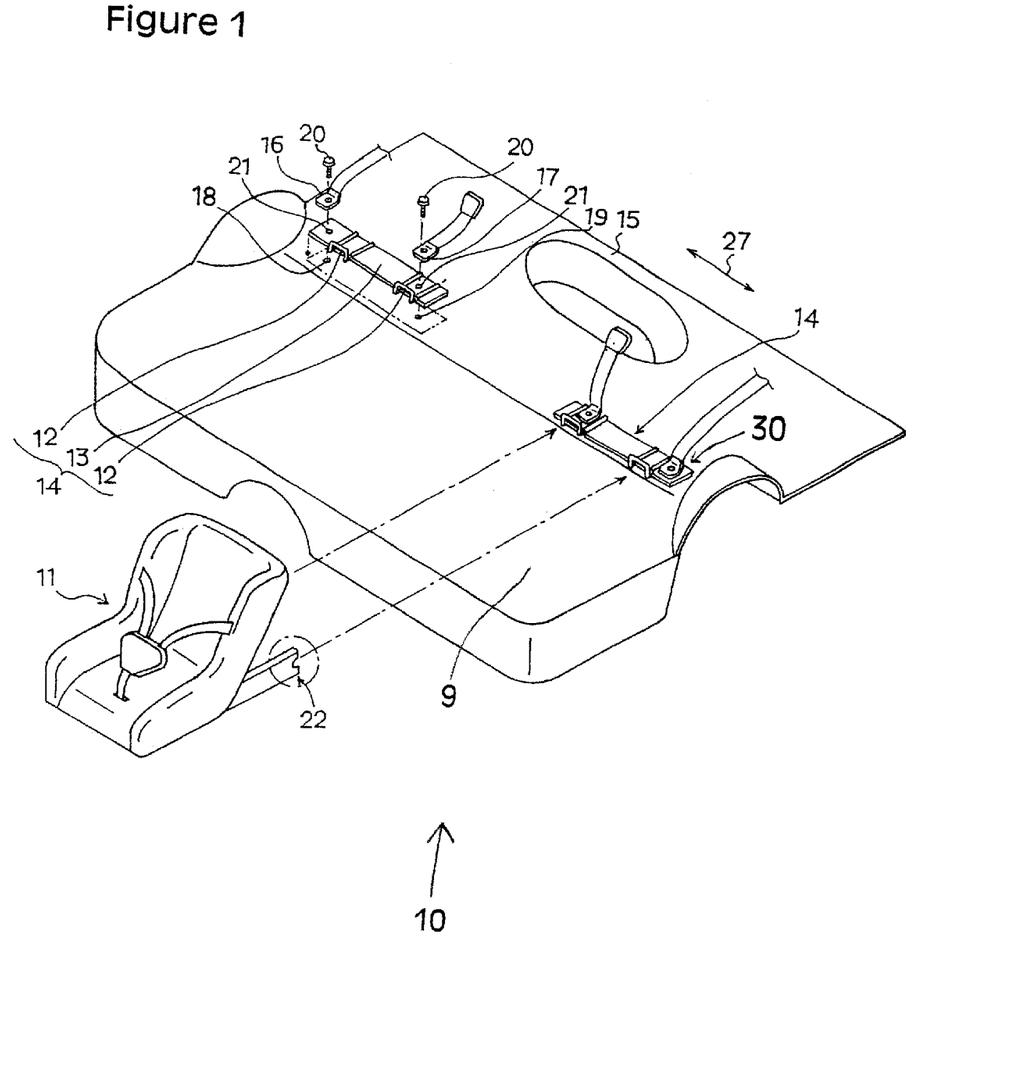
FIG. 1 is a partial, exploded diagrammatic perspective view of a child seat and a portion of a vehicle body with a pair of child seat attachment structures mounted in the vehicle in accordance with the first embodiment of the present invention.
Figure 3:
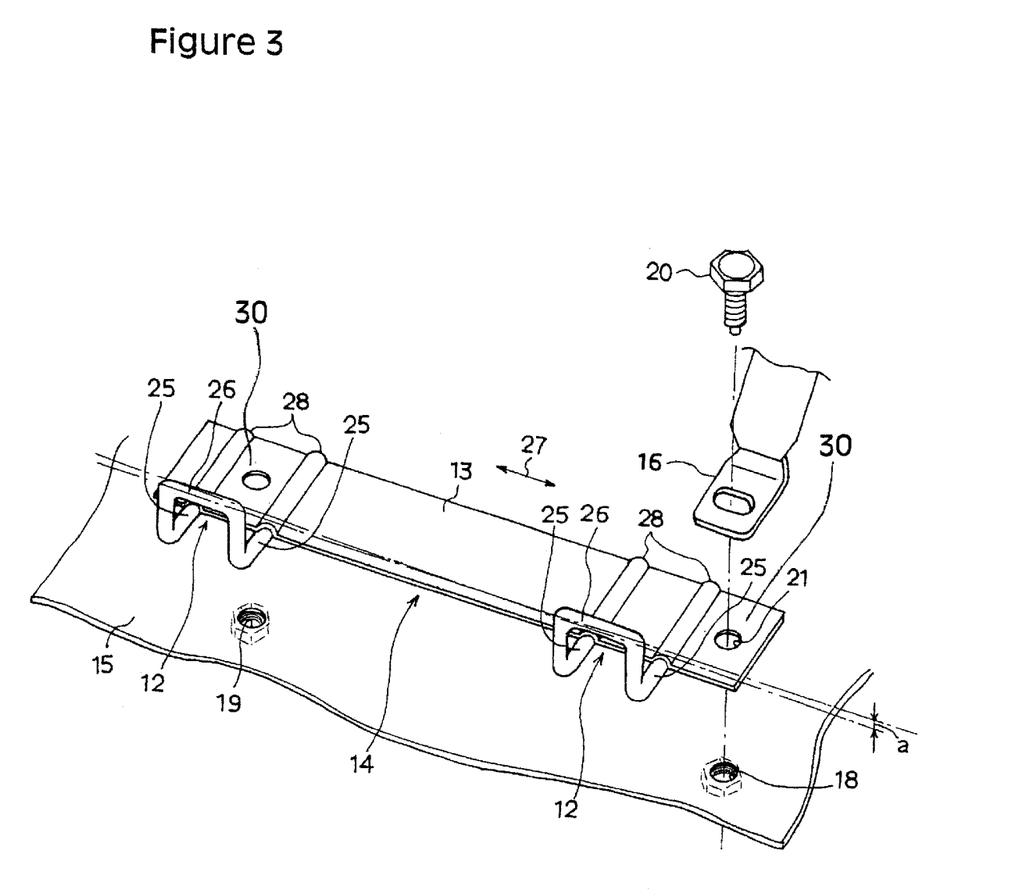
FIG. 3 is an enlarged, partial perspective view of the vehicle body illustrated in FIG. 1 with one of the child seat attachment structures coupled thereto in accordance with the first embodiment of the present invention.
Figure 4:
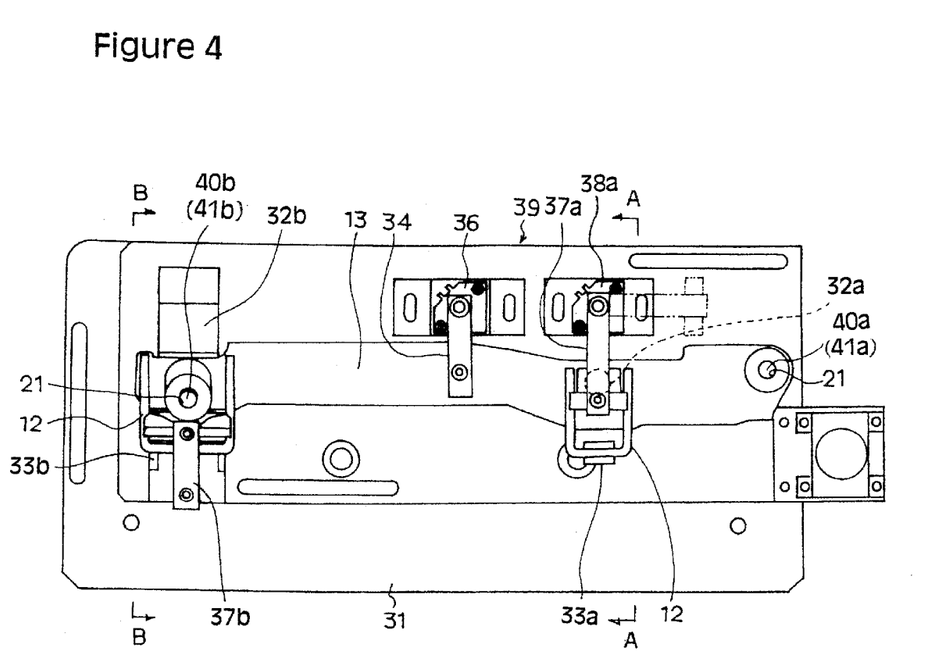
FIG. 4 is a top plan view of a manufacturing apparatus for manufacturing child seat attachment structures as illustrated in FIGS. 1 and 2 in accordance with the first embodiment of the present invention.
Figure 5:
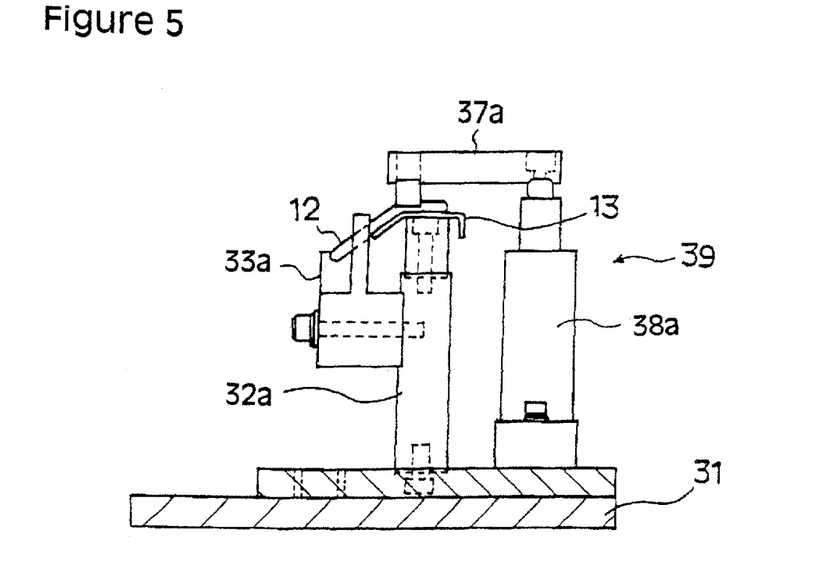
FIG. 5 is a cross sectional view of the child seat attachment structure manufacturing apparatus illustrated in FIG. 4 in accordance with the first embodiment of the present invention, as seen along section line A—A in FIG. 4.
Figure 6:
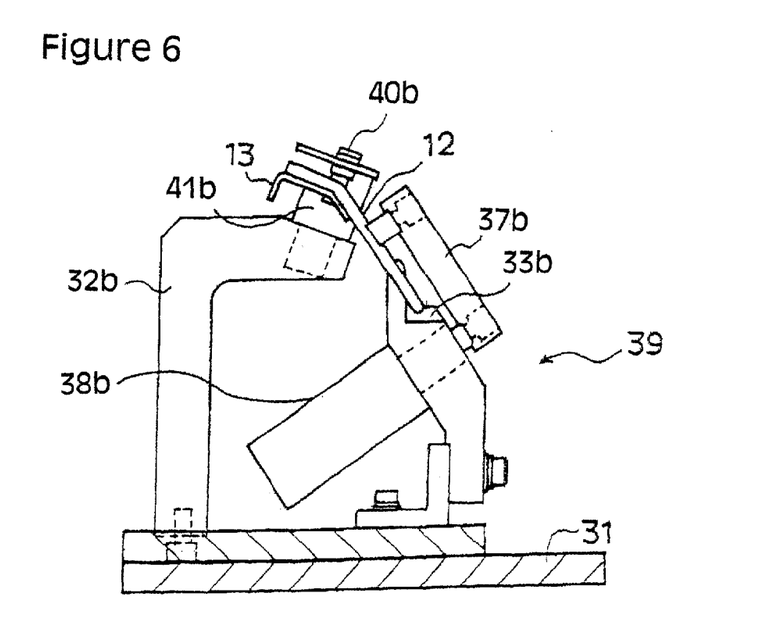
FIG. 6 is a cross sectional view of the child seat attachment structure manufacturing apparatus illustrated in FIGS. 4 and 5 in accordance with the first embodiment of the present invention, as seen along section line B—B in FIG. 4.

Referring initially to FIGS. 1 and 3, a child seat attachment structure 14 is illustrated in accordance with a first embodiment of the present invention. FIG. 1 shows a portion of a vehicle with a pair of child seat attachment structures 14 of the first embodiment of the present invention installed in a vehicle 10. More specifically, child seat attachment structure 14 is attached to a portion of a floor panel 15 of a vehicle body. The child seat attachment structure 14 is preferably located just above the top of the bottom seat cushion 9. Thus, a child seat 11 can be mounted to child seat attachment structure 14 such that the child seat 11 is supported on bottom seat cushion 9. Since child seats and floor panels are well known in the art, the structure and function of the child seat 11 and floor panel 15 would be obvious to one of ordinary skill in the art without further explanation herein. Moreover, it will be apparent to those skilled in the art from this disclosure that the child seat attachment structures 14 are so dimensioned and configured to conform to the particular structure of the floor panel 15 to which they are being secured. In other words, the precise dimensions and configuration of the child seat attachment structure 14 depend on the configuration of the floor structure 15 of the vehicle 10. For the sake of simplicity, the child seat attachment structure 14 will be illustrated with a very simple configuration as seen in FIGS. 1 and 3. Of course, child seat attachment structure 14 can have a more complex configuration as seen in FIGS. 4–6.

Referring further to FIG. 3, child seat attachment structure 14 of the first embodiment basically includes a bracket 13 and two anchors 12. In this child seat attachment structure 14, a child seat 11 is coupled to the floor panel 15 via the anchors 12. Anchors 12 are fixedly coupled to bracket 13 such that there is a predetermined lateral distance between anchors 12. The predetermined lateral distance between anchors 12 depends upon the current standards for child seats. Anchors 12 function as anchor means, which mounts child seat 11 to child seat attachment structure 14.

Bracket 13 is made from a rigid, heavy gauge sheet metal. Anchors 12 are made from bent metal bars. Therefore, a high quality child seat attachment structure 14 can be manufactured at a low cost.

Bracket 13 functions as bracket means for supporting anchors 12, which are fixedly coupled thereto. Bracket 13 has an attachment area 30 at each end thereof. Attachment areas 30 are configured to function as attachment means for attaching bracket 13 to a portion of the vehicle 10. Attachment areas 30 of the illustrated embodiment have bores 21 for attaching bracket 13 to floor panel 15 of the vehicle 10. More specifically, bracket 13 is coupled to a pair of seatbelt mounts 18 and 19 via the attachment areas 30. Seatbelt mounts 18 and 19 are holes formed in the floor panel 15 and nuts secured to the bottom surface of floor panel 15. Thus, bores 21 of attachment areas 30 of bracket 13 are formed at the same distance as the distance between mounts 18 and 19 of floor panel 15 of the vehicle 10. More specifically, attachment areas 30 are respectively attached to seatbelt mounts 18 and 19, so as to be fastened together. Seatbelt mounts 18 and 19 are seatbelt mounts for a pair of preexisting seatbelt anchors 16 and 17.

As seen in FIG. 3, attachment areas 30 of child seat attachment structure 14 are attached to mounts 18 and 19 of floor panel 15 by seatbelt anchors 16 and 17. More specifically, as seen in FIG. 1, the attachment areas 30 are inserted between seatbelt anchors 16 and 17 and seatbelt mounts 18 and 19, respectively. Then, bolts 20 are inserted through seatbelt anchors 16 and 17, bores 21 and seatbelt mounts 18 and 19, respectively. The bolts 20 engage nuts of the seatbelt mounts 18 and 19, which are welded to the bottom surface of floor panel 15. Since seatbelt anchors and the manner in which seatbelt anchors are fastened to a floor panel are well known in the art, the structures and functions of seatbelt anchors 16 and 17 and their attachment to floor panel 15 would be obvious to one of ordinary skill in the art without further explanation herein.

Figure 2:
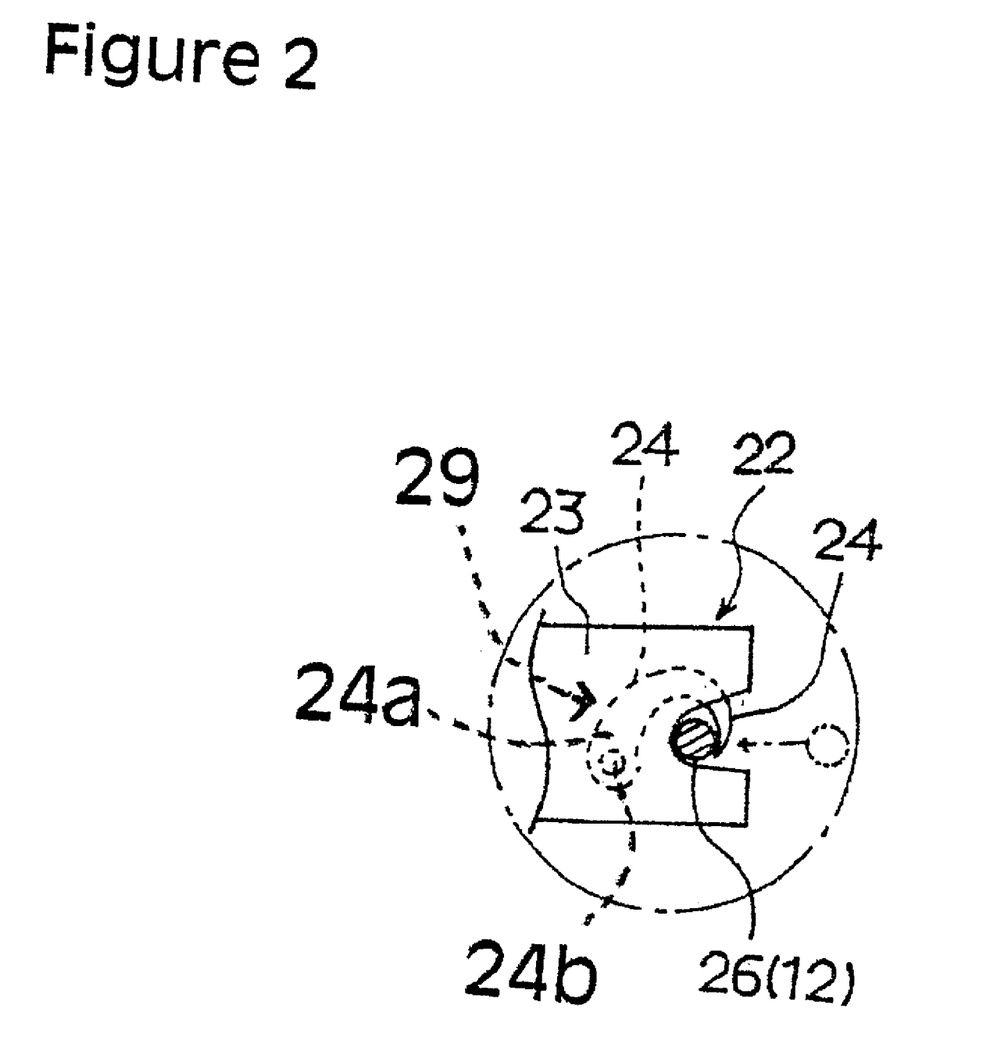
FIG. 2 is a partial enlarged elevational view of one of the coupling or installation portions of the child seat illustrated in FIG. 1.

As seen in FIG. 2, installation portions 22 of child seat 11 are each equipped with a locking mechanism 29 that conforms to the ISOFIX child seat system. ISOFIX child seat system is a model child restraint attachment system proposed by the United Nation Economic Commissions for Europe. An ISOFIX-compliant child restraint attachment system uses two lower anchorages and a top tether. The lower anchorages are located in the seat bight line, which is a region of intersection of the surfaces of the seat cushion and the seat back. The ISOFIX standards are well known in the art. Therefore, explanation of the ISOFIX standards will be omitted herein.

Referring to FIGS. 1 and 2, locking mechanism 29 of child seat 11 includes a pair of rear arms or installation portions 22 with their free ends 23 having latch mechanisms 24. Rear arms 22 protrude rearward from the rear seat surface of child seat 11, on both right and left sides of the seat surface. A notched area is formed at the free end 23 of each rear arm 22. Latch mechanism 24 is formed within each notched area. Latch mechanism 24 has a curved arm 24a and a pivot point 24b. Curved arm 24a is coupled to rear arm 22 so as to be pivotable about pivot point 24b. By pivoting curved arm 24a about pivot point 24b, an end of curved arm 24a couples anchor 12 of child seat attachment structure 14. In this manner, child seat 11 can be installed to anchors 12. Since child seats and manners of installing child seats in vehicles are well known in the art, the structure and function of child seat 11 would be obvious to one of ordinary skill in the art without further explanation herein.

Referring to FIG. 3, anchors 12 are substantially U-shaped members each having an attachment portion formed by two arms 25 that are substantially parallel to each other, and a connecting portion 26 that connects arms 25. Arms 25 are fixedly coupled to bracket 13. Arms 25 of anchors 12 are preferably welded to bracket 13 at prescribed positions that correspond to positions of installation portions or rear arms 22 of child seat 11, such that child seat attachment structure 14 is formed as an integral unit. Child seat 11 is attached to connecting portion 26 of anchor 12 in a conventional manner. Connecting portion 26 is linear and extends in the lateral or width direction of the vehicle 10. Furthermore, arms 25 are bent at a predetermined angle in an upward direction such that connecting portion 26 is positioned at a higher vertical position than bracket 13.

Bracket 13 has two pairs of grooves 28 that are positioned to accommodate arms 25 of anchors 12 therein. Arms 25 are preferably fixedly coupled within grooves 28 of bracket 13 by welding. More specifically, as best seen in FIG. 3, bracket 13 is attached on top of anchors 12 when child seat attachment structure 14 is installed in floor panel 15. Therefore, when anchors 12 are pulled upward, the attachment of anchors 12 to floor panel 15 has more strength against such upward force.

Referring now to FIGS. 4–6, a manufacturing apparatus 39 is illustrated for assisting in the manufacturing of the child seat attachment structures 14. Manufacturing apparatus 39 includes a base 31, a pair of bracket supports 32a and 32b, a pair of anchor supports 33a and 33b, a bracket pressing member 34, a bracket pressing mechanism 36, a pair of anchor pressing members 37a and 37b, and a pair of pressing mechanisms 38a and 38b. By utilizing manufacturing apparatus 39, child seat attachment structure 14 can be easily manufactured with very good accuracy.

Bracket supports 32a and 32b are fixedly attached to base 31. Bracket supports 32a and 32b support two portions of bracket 13 from below. Anchor support 33b is fixedly attached to base 31, while the other anchor support 33a is fixedly attached to bracket support apparatus 32a.

Anchor supports 33a and 33b support anchors 12 from below. Particularly, connecting portions 26 of anchors 12 are supported by anchor supports 33a and 33b. In this embodiment, two anchor supports 33a and 33b are respectively attached to bracket support apparatus 32a as seen in FIG. 5, and to base 31 as seen in FIG. 6. Bracket pressing member 34 is pressed down on bracket 13 from above by bracket pressing mechanism 36. Referring to FIGS. 5 and 6, bracket 13 and anchor 12 are supported by bracket supports 32a and 32b and anchor supports 33a and 33b such that bracket 13 and anchors 12 are placed upside down with respect to the orientations of bracket 13 and anchors 12 when child seat attachment structure 14 is installed on floor panel 15.

Bracket pressing mechanism 36 pushes bracket pressing member 34 downwardly against the bottom surface of the bracket 13. Bracket pressing mechanism 36 can be any type of device that can apply a holding force on bracket. For example, the bracket pressing mechanism 36 can be hydraulic or pneumatic cylinder.

As shown in FIG. 4, each of anchor pressing members 37a and 37b is a substantially T-shaped member as viewed from a top plan view. Preferably, anchor pressing members 37a and 37b are pivotally coupled to the anchor pressing mechanisms 38a and 38b, respectively, so that the anchors 12 and bracket 13 can be easily placed below anchor pressing members 37a and 37b. Anchor pressing members 37a and 37b press down on anchors 12 from above to apply a holding force on anchors 12 for retaining anchors 12 against bracket 13. Specifically, anchor pressing members 37a and 37b apply a holding force on arms 25 of anchors 12, such that arms 25 are fitted into grooves 28 of bracket 13.

Anchor pressing mechanisms 38a and 38b push the anchor pressing members 37a and 37b toward anchors 12. Anchor pressing mechanisms 38a and 38b can be any type of device that can apply a holding force on anchors 12 for retaining anchors 12 against bracket 13. For example, the anchor pressing mechanisms 38a and 38b can be hydraulic or pneumatic cylinders.

In this embodiment, manufacturing apparatus 39 further includes two locator pins 40a and 40b and two locators 41a and 41b. Locator 41a is formed on base 31, while the other locator 41b is attached to bracket support 32b. More specifically, the right hand side locator 41 a in FIG. 4 is formed on base 31. The left hand side locator 41b in FIG. 4 is formed on bracket support 32b as seen in FIG. 6. Each of the locators 41a and 41b is a support member with a bore that receives one of the locator pins 40a and 40b, which is inserted through corresponding bore 21 of bracket 13. In other words, the bores 21 of bracket 13 are aligned with the bores of the locators 41a and 41b, and then the two locator pins 40a and 40b are inserted through the bores 21 of bracket 13 and the bores of the locators 41a and 41b to properly align bracket 13 on manufacturing apparatus 39.

Further, it is possible to form concave portions in portions of anchor supports 33a and 33b and anchor pressing members 37a and 37b that contact anchors 12, such that the shapes of the concave portions correspond to the shape of anchors 12. Since the concave portions further support the anchors 12, anchors 12 can be more stably supported by anchor supports 33a and 33b and anchor pressing members 37a and 37b.

Operation of child seat attachment structure 14 in accordance with the first embodiment of the present invention will now be explained below. Child seat attachment structure 14 is installed in the vehicle 10 in the manner discussed above. Child seat 11 is mounted to child seat attachment structure 14 by sliding the notches of child seat 11 toward anchors 12. By bringing the notches of rear arms 22 to anchors 12 of child seat attachment structure 14, the latch mechanisms 24 latch onto connecting portions 26 of anchors 12. Since child seat attachment structure 14 is installed in vehicle body floor panel 15, the child seat 11 can be fixedly coupled to vehicle body floor panel 15 in this manner.

With child seat attachment structure 14 of the first embodiment of the present invention, it is possible to more precisely install anchors 12 on desired positions of vehicle body floor panel 15 than with conventional technology, which uses small anchors directly welded to the floor panel. Further, in child seat attachment structure 14 of the present invention, connecting portions 26 of anchors 12 can be held such that connecting portions 26 are substantially parallel to each other. More precisely, connecting portions 26 are positioned on one substantially straight line, i.e., substantially axially aligned. In other words, the connecting portions 26 of a pair of anchors 12 are within an angle "a" of ± 2 degrees as seen in FIG. 3. Therefore, child seat 11 can be stably mounted without any looseness. In addition, child seat attachment structure 14 can be installed onto vehicle body without having to install a designated reinforcing material in vehicle body, since bracket 13 itself functions as a reinforcing material. Accordingly, the weight and cost of the vehicle 10 can be reduced. Still further, anchors 12 are fitted into grooves 28 of bracket 13. Therefore, anchors 12 can be fixedly coupled to bracket 13 easily on precise positions with respect to bracket 13.

Since child seat attachment structure 14 is mounted onto vehicle floor panel 15 by fastening child seat attachment structure 14 together with seatbelt anchors 16 and 17 at seatbelt mounts 18 and 19 of floor panel 15, child seat attachment structure 14 can be installed regardless of the vehicle type and vehicle design. In particular, child seat attachment structure 14 can be installed in the same manner even when the design of vehicle 10 and/or the shape of vehicle body are changed due to model change. Also, since seatbelt mounts 18 and 19 of floor panel 15 are utilized to install child seat attachment structure 14, child seat attachment structure 14 can be fixed to vehicle body easily with bolt-on work, without having to change vehicle body shape.

In particular, since child seat attachment structure 14 has attachment areas 30 which can be fixed to the pair of seatbelt mounts 18 and 19 of existing seatbelt anchors 16 and 17, it is easy to install child seat attachment structure 14 in vehicles that have already been sold to users. Also, rotation of bracket 13 about an axis extending in a front-rear direction of the vehicle 10 can be stopped since bracket 13 is held to two seatbelt mounts 18 and 19 of floor panel 15, via the pair of seatbelt anchors 16 and 17.

Also, since anchor 12 is a substantially U-shaped member having substantially parallel arms 25 and connecting portion 26 therebetween, anchor 12 has a simple structure in which areas that are fixedly coupled to bracket 13 are separated from an area that functions as an anchor to child seat 11. Furthermore, since connecting portion 26 of each anchor 12 has a linear shape that extends in the direction of vehicle width shown as an arrow 27 in FIG. 1, each connecting portion 26 has sufficient length to attach thereto rear arms or installation portions 22 of child seat 11 equipped with a locking mechanism 29 that conforms with ISOFIX standards.

Still further, since grooves 28 are formed in bracket 13 to accommodate arms of each anchor 12, anchors 12 can be fixedly coupled to bracket 13 more easily and stably. As a result, anchors 12 can be installed more accurately and strongly with respect to floor panel 15 of the vehicle 10. In addition, since bracket 13 and anchors 12 are made from metal sheet and bent metal bars, respectively, high quality bracket 13 and anchors 12 can be manufactured at a low cost. Furthermore, since bracket 13 is attached on top of anchors 12 when child seat attachment structure 14 is installed in the vehicle 10, bracket 13 can press down on anchors 12 from above when anchors 12 are pulled upwards. Therefore, anchors 12 can be attached to bracket 13 more stably. As a result, child seat 11 can be attached to anchors 12 more strongly.

Child seat attachment structure 14 is manufactured as follows using manufacturing apparatus 39 shown in FIGS. 4–6. As shown in FIGS. 5 and 6, the bracket 13 is supported upside down by bracket supports 32a and 32b with respect to the orientation of bracket 13 installed in the vehicle 10. Anchors 12 are supported from below by anchor supports 33a and 33b. Then, locator pins 40a and 40b are inserted into bores 21 of attachment areas 30 that are formed on bracket 13 to set the position of bracket 13 relative to the positions of manufacturing apparatus 39. Locater pins 40a and 40b are further supported by locators 41a and 41b, which are respectively formed on base 31 and bracket support 32b. Accordingly, the position of bracket 13 is determined with respect to manufacturing apparatus 39. Thereafter, pressing mechanism 36 is activated to press bracket 13 from above with bracket pressing member 34. Also, anchors 12 are placed within grooves 28 of bracket 13. Then, by activating anchor pressing mechanisms 38a and 38b, anchors 12 are pressed from above by anchor pressing members 37a and 37b. In this manner, anchors 12 are either press-fitted into or merely held in grooves 28 of bracket 13. Once anchors 12 are securely press-fitted into or held in grooves 28 of bracket 13 by manufacturing apparatus 39 in this manner, a welding device, which is not shown in the figures, welds and fixes together bracket 13 and anchors 12. In this way, by using manufacturing apparatus 39, child seat attachment apparatus 14 can be easily manufactured with very good accuracy.

SECOND EMBODIMENT

Figure 7:
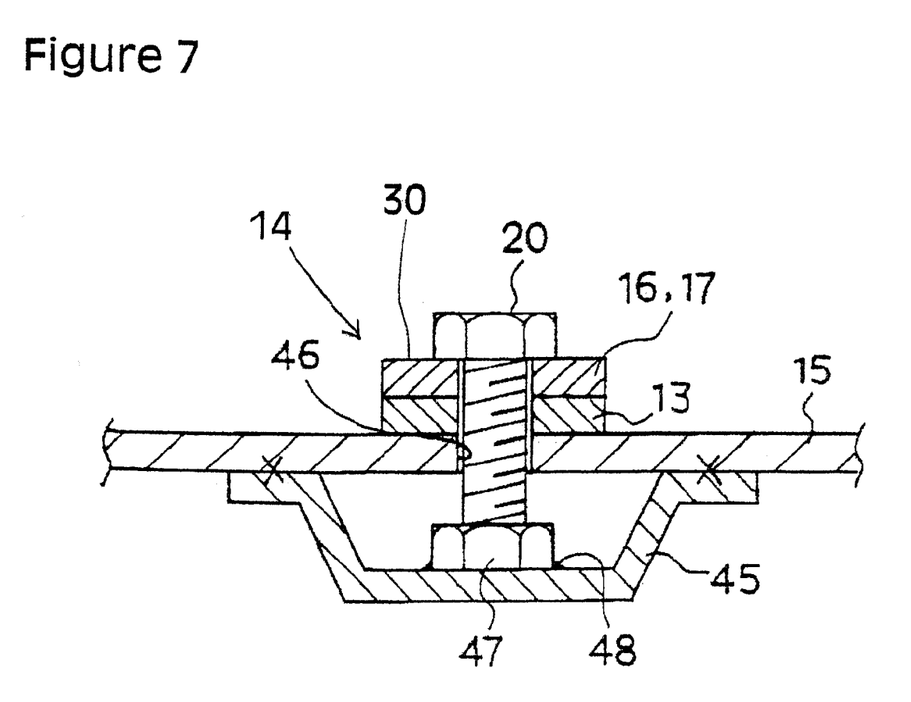
FIG. 7 is a cross sectional view of the child seat attachment structure attached to a modified vehicle body in accordance with a second embodiment of the present invention.

Referring now to FIG. 7, the child seat attachment structure 14, discussed above is attached to floor panel 15 by a reinforcing member 45 in accordance with a second embodiment of the present invention, which will now be explained. In view of the similarity between the first embodiment and the second embodiment, only parts of reinforcing member 45 and its connection to the child seat attachment structure 14 and the floor panel 15 will be explained herein.

As seen in FIG. 7, child seat attachment structure 14 in this second embodiment of the present invention is mounted on reinforcing member 45 that is attached to the under surface of floor panel 15. Reinforcing member 45 has a hatshaped cross section, and is coupled to attachment area 30, with a portion of the vehicle floor panel 15 attached therebetween. In other words, reinforcing member 45 is attached to the opposite side or underside surface of the portion of floor panel 15 where attachment area 30 is attached. Reinforcing member 45 functions as reinforcing means, and reinforces the attachment of bracket 13 to floor panel 15 of the vehicle 10. The reinforcing member 45 can be considered an additional part of child seat attachment structure 14 that can be used as needed and/or desired.

In this case, a through-hole 46 is made in floor panel 15 such that bolt 20 can be inserted therethrough. Also, a nut 47 is fixedly coupled by welds 48 to an upwardly facing side or inner side of reinforcing member 45. Since reinforcing member 45 is fixed to child seat attachment structure 14 by fastening together bolt 20 and nut 47, child seat attachment structure 14 can be installed even more strongly to floor panel 15. Accordingly, child seat 11 can be installed more strongly in the vehicle 10.

The embodiments of the present invention explained with reference to the figures herein should not be construed as limitation to the structures of the present invention. Other structures that encompass design changes are also within the scope of the present invention as long as they do not deviate from the gist of the present invention. For example, child seat attachment structure 14 can have anchors 12 that are attached to bracket 13 such that connecting portions 26 face rearward with respect to the orientation of the vehicle 10.

The terms of degree such as "substantially", "about" and "approximately" as used herein mean a reasonable amount of deviation of the modified term such that the end result is not significantly changed. These terms should be construed as including a deviation of ± 5% of the modified term if this would not negate the meaning of the word it modifies.

This patent application claims priority to Japanese Patent Application No. 2000-27592. The entire disclosure of Japanese Patent Application No. 2000-27592 is hereby incorporated herein by reference.

While only selected embodiments have been chosen to illustrate the present invention with reference to figures, it will be apparent to those skilled in the art from this disclosure that various changes and modifications in design can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A child seat attachment structure adapted to install a child seat in a vehicle, the child seat attachment structure comprising:
   a bracket having an attachment area that is configured to be attached to a portion of the vehicle; and
   two anchors fixedly coupled to the bracket with a predetermined lateral distance between the anchors, the anchors being configured to attach a child seat thereto,
   the attachment area being configured to be attached to a seatbelt mount of the vehicle by a seatbelt anchor.

2. The child seat attachment structure as set forth in claim 1, wherein
   each of the anchors has a connecting portion and an attachment portion, the attachment portion being fixedly coupled to the bracket.

3. The child seat attachment structure as set forth in claim 2, wherein
   each of the attachment portions has a pair of arms that are substantially parallel to each other and extend from opposite ends of the connecting portion which connects the arms, such that each of the anchors is substantially U-shaped.

4. The child seat attachment structure as set forth in claim 3, wherein
   the connecting portions of the anchors are substantially parallel and axially aligned to each other.

5. The child seat attachment structure as set forth in claim 1, further comprising reinforcing member coupled to the attachment area with the portion of the vehicle to which the attachment area is attached therebetween.

6. The child seat attachment structure as set forth in claim 1, wherein the bracket is made from a sheet metal material; and the anchors are bent metal bars.

7. A child seat attachment structure adapted to install a child seat in a vehicle, the child seat attachment structure comprising:

a bracket having an attachment area that is configured to be attached to a portion of the vehicle; and two anchors fixedly coupled to the bracket with a predetermined lateral distance between the anchors, the anchors being configured to attach a child seat thereto, each of the anchors having a connecting portion and an attachment portion, the attachment portion being fixedly coupled to the bracket, the attachment portions of the anchors being welded to the bracket.

8. A child seat attachment structure adapted to install a child seat in a vehicle, the child seat attachment structure comprising:

a bracket having an attachment area that is configured to be attached to a portion of the vehicle; and two anchors fixedly coupled to the bracket with a predetermined lateral distance between the anchors, the anchors being configured to attach a child seat thereto, each of the anchors having a connecting portion and an attachment portion, the attachment portion being fixedly coupled to the bracket, each of the attachment portions having a pair of arms that are substantially parallel to each other and extend from opposite ends of the connecting portion which connects the arms, such that each of the anchors is substantially U-shaped, the bracket having grooves that accommodate the arms of the anchors.

9. A child seat attachment structure adapted to install a child seat in a vehicle, the child seat attachment structure comprising:

a bracket having an attachment area that is configured to be attached to a portion of the vehicle; and two anchors fixedly coupled to the bracket with a predetermined lateral distance between the anchors, the anchors being configured to attach a child seat thereto, the bracket being configured with an upwardly facing surface and a downwardly facing surface with the anchors being attached to the downwardly facing surface when the child seat attachment structure is installed in the vehicle.

10. A method of forming a child seat attachment structure on a vehicle, comprising:

forming a bracket that conforms to a contour of a portion of a vehicle body;

fixing two anchors to the bracket with a predetermined lateral distance between the anchors; and attaching the bracket with the anchors to the portion of the vehicle body including attaching the anchors between the bracket and the portion of the vehicle body.

11. The method as set forth in claim 10, further comprising attaching a reinforcing member to an undersurface of the portion of the vehicle body with the bracket being fastened to the reinforcing member by a fastener.

12. A method of forming a child seat attachment structure on a vehicle, comprising:

forming a bracket that conforms to a contour of a portion of a vehicle body;

fixing two anchors to the bracket with a predetermined lateral distance between the anchors; and attaching the bracket with the anchors to the portion of the vehicle body including attaching the bracket to a seatbelt mount of the vehicle by a seatbelt anchor.

13. A child seat attachment structure adapted to install a child seat in a vehicle, the child seat attachment structure comprising:

a pair of anchor means for fixedly mounting the child seat to the child seat attachment structure;

bracket means for supporting the pair of the anchor means at a predetermined lateral distance apart from each other; and attachment means for attaching the bracket means to a portion of the vehicle.

14. The child seat attachment structure as set forth in claim 13, wherein the attachment means is configured to be attached to a seatbelt mount of the vehicle.

15. The child seat attachment structure as set forth in claim 13, further comprising reinforcing means for reinforcing attachment of the bracket means to the portion of the vehicle.

* * * * *